US012373738B1

(12) United States Patent
White et al.

(10) Patent No.: US 12,373,738 B1
(45) Date of Patent: Jul. 29, 2025

(54) TRANSFORMERS ADAPTED FOR PREDICTIVE TARGETING BASED ON WEB BROWSING HISTORY

(71) Applicant: Dstillery, Inc., New York, NY (US)

(72) Inventors: Amelia Grieve White, Old Greenwich, CT (US); Christopher Allen Jenness, Brooklyn, NY (US); Jason Jerard Kaufman, White Plains, NY (US); Justin Matthew Moynihan, Rochester, NY (US); Alexander Michael Kokkoros, Monroe, CT (US); Navarre E. Pratt, New York, NY (US); Melinda Han Williams, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 0 days.

(21) Appl. No.: 18/732,558

(22) Filed: Jun. 3, 2024

Related U.S. Application Data

(60) Provisional application No. 63/505,929, filed on Jun. 2, 2023.

(51) Int. Cl.
*G06N 20/00* (2019.01)
*G06Q 30/0251* (2023.01)

(52) U.S. Cl.
CPC ......... *G06N 20/00* (2019.01); *G06Q 30/0255* (2013.01)

(58) Field of Classification Search
CPC .......................... G06Q 30/0255; G06N 20/00
See application file for complete search history.

(56) References Cited

U.S. PATENT DOCUMENTS 10,902,009 B1 1/2021 Lenz, Jr. et al.
11,068,935 B1 7/2021 White et al.
11,423,451 B1 * 8/2022 Chaudhari ............ G06F 16/638
2004/0078300 A1 * 4/2004 Smith ................ G06Q 30/0601 705/26.1
2020/0327444 A1 * 10/2020 Negi .................. G06Q 30/0281
2023/0316301 A1 * 10/2023 Shi ......................... G06N 20/20 705/7.31

OTHER PUBLICATIONS

Vaswani et al., "Attention is all you need," Advances in Neural Information Processing Systems, 31st Conference on Neural Information Processing Systems (NIPS 2017), Dec. 4-9, 2017, pp. 5998-6008.

* cited by examiner

*Primary Examiner* — Scott C Anderson
(74) *Attorney, Agent, or Firm* — COOLEY LLP

(57) ABSTRACT

Some embodiments described herein relate to computer implemented methods and/or memory (e.g., a non-transitory, processor-readable medium) storing code configured to be executed by a processor to cause the processor to perform the method. The method can include training a first transformer with a plurality of website visitation records to predict a missing website in a sequence of websites. The first transformer can include a foundation model and a first prediction head. A second transformer model can be trained with a plurality of conversion event data to predict a probability of a conversion event occurring. The second transformer model can include the foundation model and a second prediction head.

18 Claims, 13 Drawing Sheets

Processor 132
Memory 134
Webservers 130
Processor 112
Memory 114
Audience Identification Device 110
Network
190
Processor 122
Memory 124
Targeted Content Provider 120
Processor 162
Memory 164
User Devices 160
100

TRANSFORMERS ADAPTED FOR PREDICTIVE TARGETING BASED ON WEB BROWSING HISTORY

CROSS REFERENCE TO RELATED APPLICATION

This application is a non-provisional of and claims priority to provisional U.S. Patent Application No. 63/505,929, filed Jun. 2, 2023, the disclosure of which is hereby incorporated by reference in its entirety.

TECHNICAL FIELD

The present disclosure generally relates to determining relationships between websites and using machine learning models to predict user actions based, at least in part, on actions of other users.

BACKGROUND

Some embodiments described herein relate to supervised machine learning techniques that enable improvements in identifying target audiences and/or user behavior.

Advertisers placing digital ads need ways to find effective and efficient placements for their ads. This is most commonly done by identifying potential consumers who would make good candidates to see the ads, often based on the digital or offline behavior associated with their devices.

New techniques for characterizing audiences and selecting targets for the delivery of targeted content have arisen in the internet age, and targeted content delivery has become a fundamental feature of the modern internet. Targeted content delivery can be roughly divided into two distinct modes, retargeting and prospecting. Retargeting involves providing targeted content to people who have previously taken a predefined action, while prospecting involves predicting which people are likely to be interested in targeted content. For example, during a retargeting campaign, individuals who have previously visited particular predefined webpages, purchased certain predefined items, and/or have social media connections with predefined profiles, may be selected to receive targeted content. Retargeting can include sending brand-related content to individuals who have previously interacted with the brand. Prospecting, by contrast, seeks to identify individuals who may be interested in the targeted content who have not been observed taking any particular predefined action. Prospecting generally involves the analysis of a relatively large amount of data associated with the user.

Modern prospecting is typically a "big data" operation, in which sophisticated algorithms process large amounts of information with the goal of quickly grouping or classifying individuals based on their predicted affinity to a content item. Known techniques, however, suffer from a number of drawbacks.

Traditionally individual users have been classified using an identifier shared by the user's device, such as a cookie identifier, identifier for advertising, or other suitable indicator that can be received by websites and/or advertisers when that individual visits a particular website. Such identifiers have traditionally allowed content providers to track individuals across domains and characterize individuals based on a browsing history. Data associated with such profiles can be used as features for a supervised training model to predict or classify users as valuable targets for an advertising campaign.

However, a number of factors may make it more difficult to gather extensive profiles or histories to provide accurate prediction or classification. In the past it was common to gather histories associated with a device going back for the lifetime of that device. Now, due changes in regulations and industry standards, for many data sources its limited to shorter time periods, such as 1 or 2 years, 30 days, or less, and acceptable time periods may continue to shorten in the future. Within that shortened time period, there might be fewer observed events, so there is generally just less data associated with a device, making accurate prediction more difficult. Additionally, as regulations, industry standards, and technical standards change, the number of sources available for data collection may decline. Furthermore, restrictions, regulations, and expressions of user preference may make it increasingly difficult to join together multiple data sources to create in-depth user profiles. All of these trends lead to a decrease in the amount and granularity of user data, increasing the difficulty of a prediction task.

Selecting and delivering targeted content for users based on the user browsing history under these circumstances presents numerous challenges based on the currently available algorithms. Accordingly, there is a need for systems and methods to predict user activity and/or select and deliver targeted content for users based on the user browsing history.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Some embodiments described herein relate to computer implemented methods and/or memory (e.g., a non-transitory, processor-readable medium) storing code configured to be executed by a processor to cause the processor to perform the method. The method can include training a first transformer with a plurality of website visitation records to predict a missing website in a sequence of websites. The first transformer can include a foundation model and a first prediction head. A second transformer model can be trained with a plurality of conversion event data to predict a probability of a conversion event occurring. The second transformer model can include the foundation model and a second prediction head.

Some embodiments described herein relate to a computer implemented method and/or memory storing code configured to cause a processor to access a first dataset representing a first set of website visitation records. A second dataset representing a second set of website visitation records can also be accessed. A first transformer model that including a foundation model that includes the foundation model and a second prediction head and a first prediction head can be trained using the first data set. A second transformer model that includes the foundation model and a second prediction head can be trained using the second dataset A probability of a conversion event occurring can be predicted based on a third data set and using the second transformer model.

Aspects of the present disclosure are related to system and methods for predictive targeting based on web browsing history. It should be noted that any other type of analogous digital content may be used together with or instead of the web browsing history. For example, store visitation history data, device usage history, application usage history, physical location of a device, device physical location history, and the like can be used as an additional digital content or digital content that can replace the web browsing history.

Figure 1:
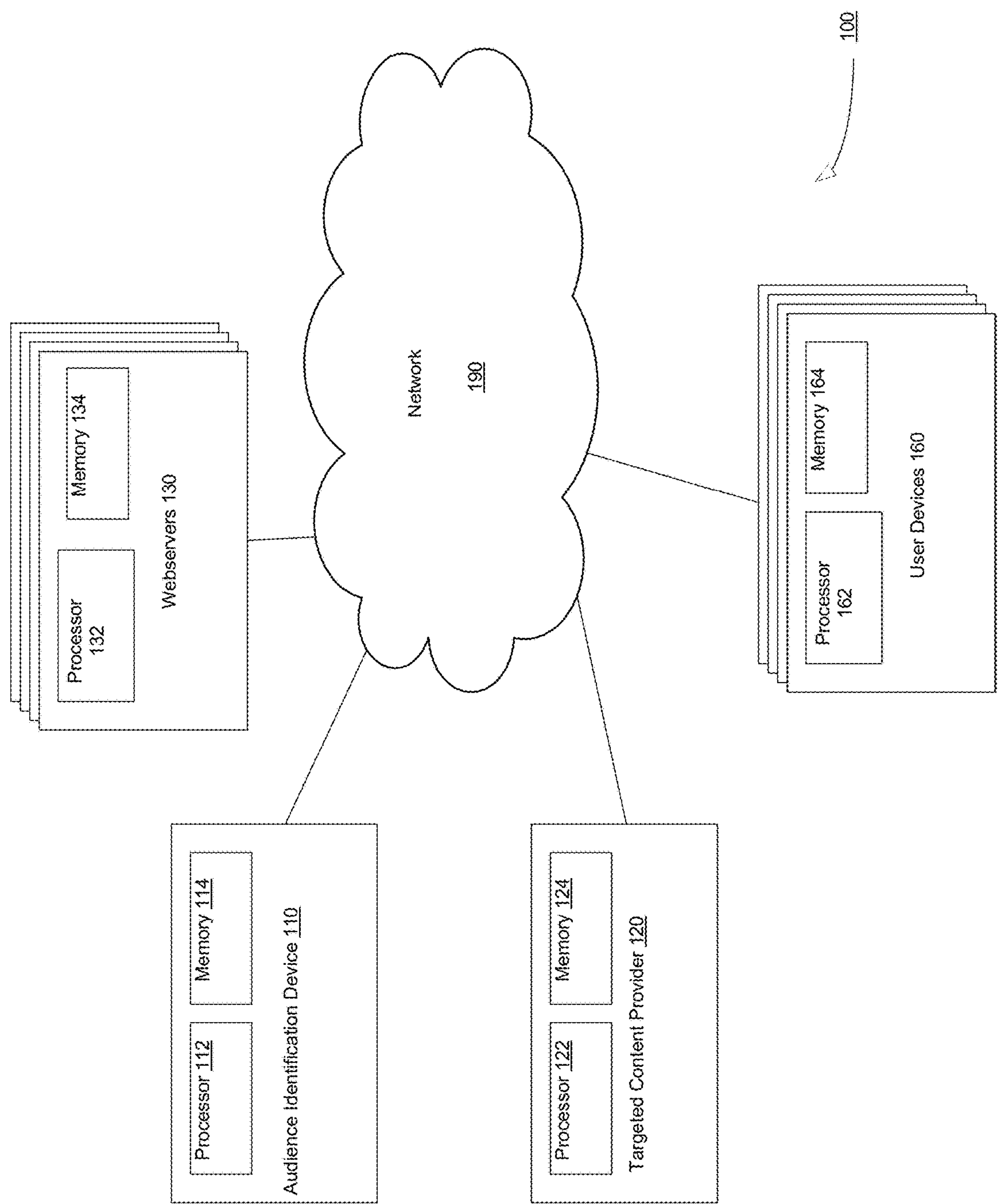
FIG. 1 is a schematic illustration of a system that includes an audience identification device, according to an embodiment.

FIG. 1 is a schematic illustration of a system 100, according to an embodiment. The system 100 includes an audience identification device 110, a targeted content provider 120, one or more webservers 130, and one or more user devices 160, each communicatively coupled via a network 190. The network 190 can be the internet, an intranet, a local area network (LAN), a wide area network (WAN), a virtual network, a telecommunications network, any other suitable communication system and/or combination of such networks. The network 190 can be implemented as a wired and/or wireless network.

The user devices 160 are computing entities, such as personal computers, laptops, tablets, smartphones, or the like, each having a processor 162 and a memory 164. The processor 162 can be, for example, a general purpose processor, a Field Programmable Gate Array (FPGA), an Application Specific Integrated Circuit (ASIC), a Digital Signal Processor (DSP), and/or the like. The processor 162 can be configured to retrieve data from and/or write data to memory, e.g., the memory 164, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. Each user device 160 can be operable to access one or more of the webservers 130. For example, a user operating a user device 160 to browse the internet (e.g., the network 190) can access webpages stored on one or more of the webservers 130. The webservers 130 can be computing entities each having a processor 132 and a memory 134, which can be structurally and/or functionally similar to the processors 162 and/or 164, respectively, discussed above.

The targeted content provider 120 can be a computing entity operable to select, deliver, and/or facilitate the delivery of one or more items of targeted content. For example, the targeted content provider 120 can be associated with an advertiser or advertising network that provides targeted content that is displayed by a user device 160 when that user device 160 accesses a particular webserver 130. Similarly stated, targeted content selected, delivered, or facilitated by the targeted content provider 120 can include advertisements embedded within, displayed with, or otherwise associated with webpages displayed by a user device 160. The targeted content provider 120 includes a processor 122 and a memory 124, which can be structurally and/or functionally similar to the processor 162 and/or memory 164, respectively, discussed above.

The audience identification device 110 can be a computing entity configured to receive signals indicative of actions or behaviors of users associated with some or all of user devices 160. For example, the audience identification device 110 can receive web visitation data for user devices 160 and/or webservers 130 using cookie-based or any other suitable technique for network traffic attribution (e.g., any suitable technique for identifying that a user device was used to access a webserver including, for example monitoring logged-in identifiers, probabilistic identifiers, Internet Protocol (IP) addresses of user devices 160, user agents of user devices 160 and/or browser fingerprints, time of day, location, etc.). In addition, or alternatively, any suitable signal, such as a signal representing behavioral data can be received by the audience identification device 110 and associated with a user of one or more of the user devices 160. As discussed in further detail herein, the audience identification device 110 can be operable to apply machine learning techniques to predict future user behavior, for example based on browsing history data, user identifier, or other information.

For example, the audience identification device 110 can receive information indicative of user behavior. User behavior information can include, for example, an ordered or timestamped list of websites visited by the user. In addition, or alternatively, audience identification device 110 can receive conversion event data. Conversion event data can include, for example, purchase information from purchase confirmation websites, purchase history associated with a user account, a credit reporting bureau, customer loyalty program, survey information, or any other suitable source. Conversion event data can also include information regarding whether a user took any suitable brand action, such as clicking on a predefined advertisement or like, visiting a predefined website, physically visiting a retail location, or any other suitable conversion action. Conversion event data can include information not relating to any particular brand, such as visiting one of a set of predefined websites indicating interest in a product category, activity, or other interest. Conversion event data can identify users who undertook conversion actions or can be anonymized and/or aggregated. For example, targeted content can be served to a group of user devices, for example without knowing or receiving any information about the user devices other than that they visited a website hosting the targeted content, and conversion information for that group of users (e.g., an aggregate click-through rate) can be determined and/or received. The audience identification device 110 includes a processor 112 and a memory 114, which can be structurally and/or functionally similar to the processor 162 and/or the memory 164, respectively, discussed above.

In some embodiments, the memory 114 can store a vector for each user device 160 and/or for each user associated with one or more user devices 160. Such a vector can represent that user device's/user's behavior in a format discussed in further detail in U.S. Pat. Nos. 10,902,009 and/or 11,068,935, the entire disclosure of each of which is hereby incorporated by reference in its entirety. The processor 112 can be operable to perform machine learning techniques on a matrix comprising vectors of an audience (set of users) to predict user behavior. For example, the machine learning techniques can be trained on historical behavior of users to predict websites likely to be visited by a user device based on current behavioral data associated with that user device (e.g., a next website to be visited and/or the probability that the user device will visit a particular website in the future).

The audience identification device 110 can be configured, upon determining websites that are likely to be visited by a user device and/or upon any other suitable user behavior data, communicate to the target content provider 120 a suggestion for a target content that can be provided to the user device. In some cases, the audience identification device 110 may provide more than one target content suggestions that can be provided to the user. In some cases, the target content suggestions may have an associated score identifying how likely the target content may lead to a conversion action by a user of the user device.

Aspects of the present disclosure are related to systems and methods for predictive targeting based on web browsing history using transformers (also referred to herein as transformer models). Transformers have previously been developed for natural language processing (NLP) and applied to analyze, understand, and derive meaning from human language. For example, transformer models may be used to predict a next word in a sentence, predict a missing word in a sequence of words, or classify a piece of text as having positive or negative sentiment. The use of transformer models, however, has generally been limited to NLP and other domains where it has generally been understood that subsequent data entries are logically linked to previous data entries in a human-comprehensible fashion. Embodiments described herein represent, in part, a recognition that foundation models can be modified and applied to website visitation records. Website visitation records, unlike, for example, natural language sentences, are only loosely logically linked and it is not generally possible for a human to make a logical connection between an ordered list of websites. It has not been previously recognized that transformer models, originally developed for NLP purposes can be applied to an ordered sequence of website visitation records to predict, for example, a website in a blank or missing position in the sequence or the next (i.e., subsequent) website visited. Surprisingly, despite the more attenuated logical links between previous entries and subsequent entries, transformer models can accurately predict a website and/or a cluster of websites in a blank position of the ordered list or a subsequent website given an ordered list of websites.

A machine learning model may be trained to predict the probability that given user device will perform a conversion action associated with a given advertising campaign, given historical information associated with that device. A transformer model, such as those described in A. Vaswani et al., Attention is all you need, Advances in Neural Information Processing Systems, page 5998-6008. (2017), https://arxiv.org/abs/1706.03762, details of which are herein incorporated by reference, is a type of neural network algorithm developed for NLP, which uses attention to learn relationships between positions within a sequence. By using transformer models, predictions can be made based on, for example, the ordered sequence of historical events associated with that device.

In various embodiments, transformer models can be trained to predict a website that a user may select based on that user's previous website history or website history of similar users (e.g., users of similar interests, browsing histories, and the like), to predict a website visited by a user within a sequence based on other websites in the sequence, to predict a conversion likelihood, to predict which impression shown to the user may cause the highest conversion likelihood, to provide additional information (e.g., website links) for causing a user to access websites that result in high conversion likelihood, etc.

A foundation model can be a neural network structure having multiple layers, and can be implemented as a component of a transformer model architecture. When a transformer model is trained, for example, on a large amount of web history or web browsing data, the weights, architecture, connections, and/or other suitable parameters for the foundation model are adjusted, thus, producing a trained foundation model. This may be referred to "pre-training" the foundational model. Training the transformer model (and, in the process training the foundation model) can occur via a self-supervised prediction task. In some instances, the self-supervised prediction task can be unrelated to the goal of a final machine learning model (e.g., unrelated to predicting conversion probability in response to advertising) and can be a task that can be performed on large amounts of readily available data. Similarly stated, in some instances, the self-supervised prediction task can be a relatively computationally efficient technique for training the foundation model for subsequent use in a different transformer model. For example, in a masked language model, individual words of a sentence are masked, one at a time, and the model is trained to predict each masked word. Similarly, a large amount of web history or web browsing data can be used to construct training data for a prediction task where the goal is to predict the missing website in a sequence of website visits. In this task, no manual labeling is needed, because the target data is simply the missing website that was masked to create the input data.

In various implementations, a foundation model can consist of a series of neural network layers or modules, such as a multi-head attention module, a feed-forward module, a masked multi-head attention module, or other suitable modules. These modules are designed to process and manipulate data and are incorporated into the transformer model. In other words, they form a part of the neural network structure that makes up the transformer model. In certain cases, the transformer model is specifically customized for a particular task. This customization is achieved by adding the appropriate task-specific neural network structure, also referred to as a prediction head. The prediction head can have multiple layers or can be composed of one or more neural network modules.

Figure 2A:
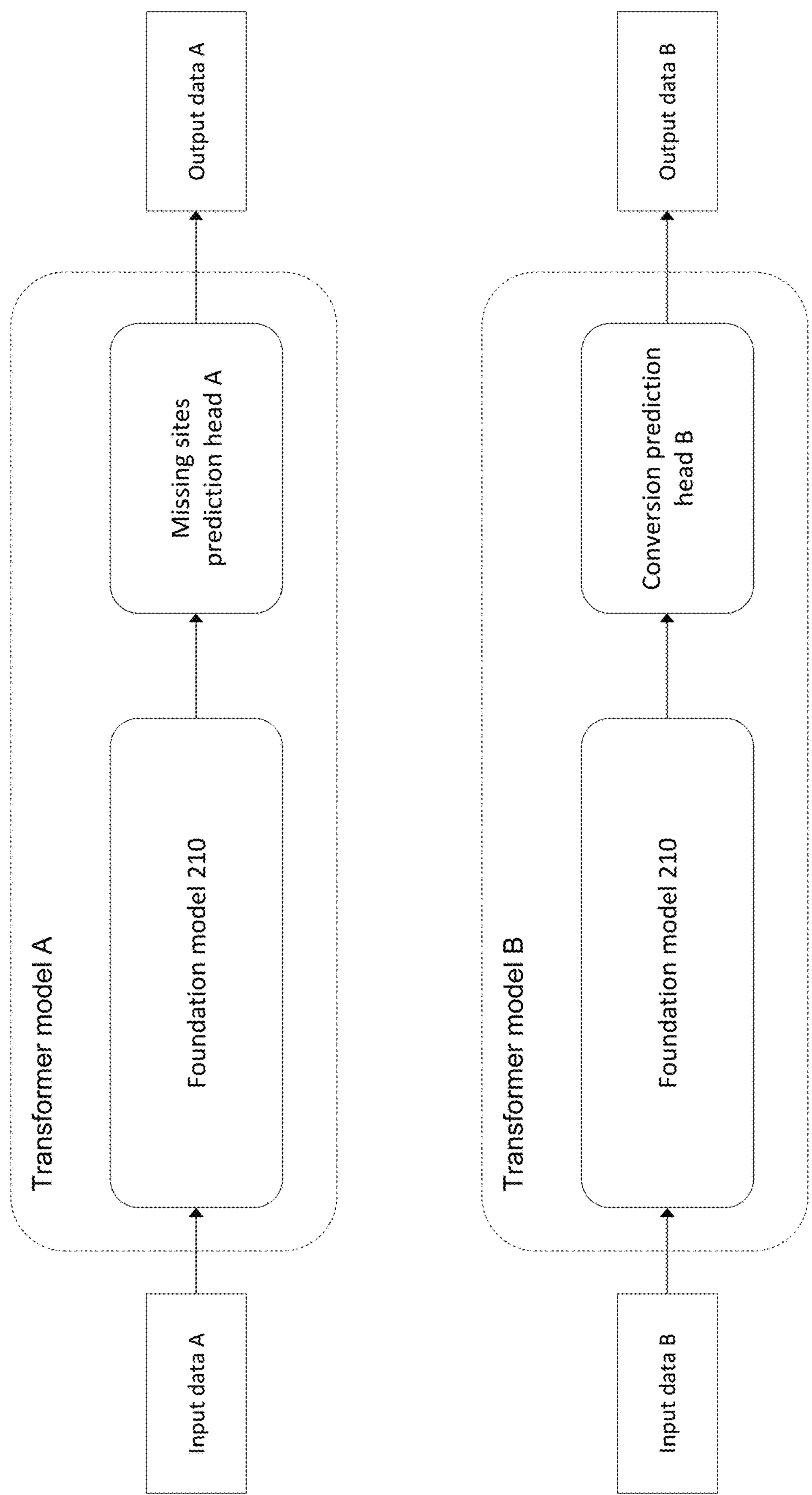
FIG. 2A is an illustrative diagram for the structure of a transformer model, according to an embodiment.
Figure 2B:
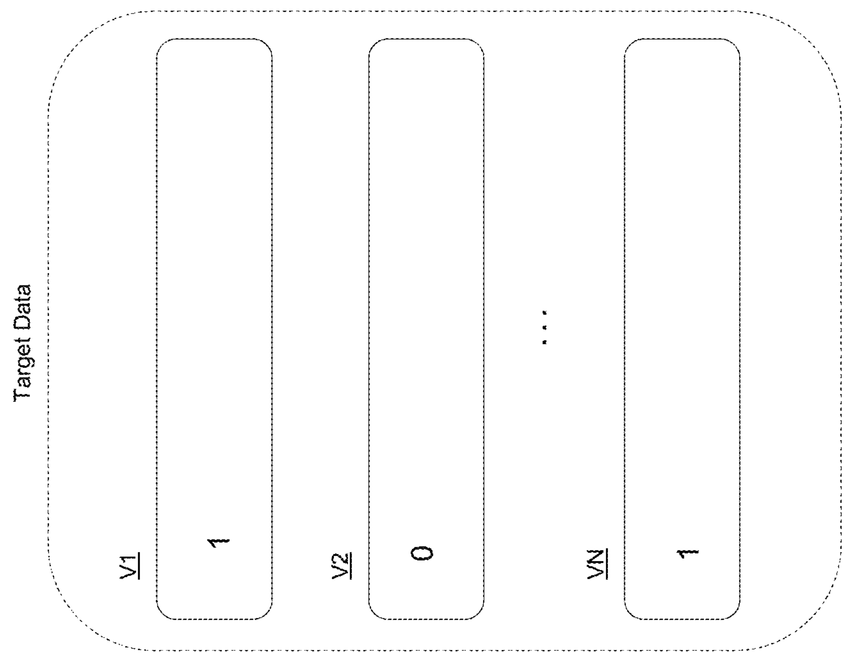
FIG. 2B is illustrative training data for training a transformer model for a binary classification task, according to an embodiment.
Figure 2B:
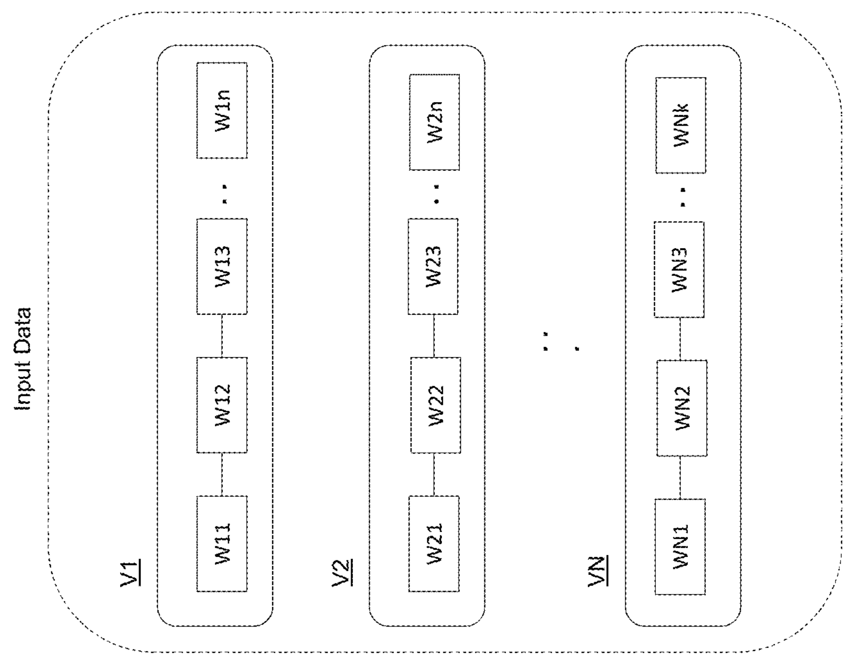

FIG. 2A shows an illustrative diagram for the structure of a transformer model A and transformer model B. Each transformer model comprises the same foundation model 210 and a different prediction head. The prediction head is configured to output data for a specific prediction task. For the transformer model A, a prediction head A may be configured to create a transformer model capable of completing a self-supervised prediction task, such as determining a masked website in a sequences of websites found in the website browsing history of a web browsing device. The resulting transformer model A can then be trained on a relevant training dataset A, which includes input data examples (labeled "Input data A" in FIG. 2A) and corresponding target outputs (labeled "Output data A in FIG. 2A). During training of the transformer model A, the weights in the neural network of the foundation model 210 (e.g., weights assigned to connections between neurons in the neural network, such as self-attention weights, feed forward weights, and the like) and the weights in the network architecture of the prediction head A can be determined (learned) through backpropagation. Then, the foundation model 210 (e.g., the network modules forming part of the transformer model A) can be used to form part of a neural network structure of another transformer model B, a transformer model that uses prediction head B to complete a different task, such as predicting whether a web browsing device will complete a conversion action. The training data for this task, training set B, includes input data B and output data B. If the prediction task performed by prediction head B is a binary classification task, then output data B includes binary class labels (e.g., labels V1, V2, . . . VN) for each record in input dataset B. (This is shown in FIG. 2B). Transformer model B can be trained using this data, either starting from scratch, with newly-initialized weights, or by initializing the weights in the foundation model to the values learned by training transformer model A.

In various implementations, a transformer model, such as transformer model A, is configured to receive as input a sequence of website related data records (e.g., website addresses) and convert each website to a token. Tokens are converted to p-dimensional embedding vectors using a matrix transformation, the matrix is referred to as an embedding matrix, and the resulting p-dimensional embedding vectors are referred to as word embeddings. The weights of this transformation are learned using a neural network. The weights can be learned as part of the training the transformer model, or they can be learned as part of a separate neural network model using separate training data and a separate prediction task. One of the properties of the embedding space is that word embeddings that have similar or related meaning are located close to each other in the embedding space. For example, in the case of an embedding of English words, the embedding vector corresponding to the word "horse" may be relatively closely positioned to an embedding vector corresponding to the word "donkey" and may have a relatively distant position from the embedding vector corresponding to the word "chair". In various cases, relationships between websites may be related to a sequential order of the websites withing the sequence of the websites, which may be part of a website visitation record visited by a user. Additionally, or alternatively, the relationships between websites may be established based on a time period between visitation events for the websites. In some cases, websites at which a user spend a longer time may be given more weight in determining the relationship between the websites, than the websites the user visited briefly.

A transformer model (e.g., a transformer model B) can be configured and trained to carry out a classification task, such as a binary (two-class) or multi-class prediction task. For example, the transformer model B can be trained to predict for a particular user device, given a sequence of website visits associated with that user device, whether the device is likely to perform a conversion event associated with a particular target content (e.g., a particular brand, a particular product, and the like). This can be used, for example, to select devices that would be good candidates to see advertising for that target content. To build a network structure suited to make a binary prediction, the final layers of the neural network structure (in other words, the prediction head B) can be specified to output a binary class prediction, in other words, the probabilities of each of the two classes. (In this example, this corresponds to outputting the probability that the device will perform the conversion action.)

As explained earlier, the transformer model B can be designed to perform the prediction task by incorporating the foundation model 210, which was initially trained for a different task, such as a self-supervised prediction task. The foundation model 210 is pre-trained using a first training set (e.g., input data A) and can utilize pre-trained components like multi-head attention for other prediction tasks. By utilizing the foundation model 210, which is trained as part of transformer model A, for transformer model B, several advantages can be achieved, such as faster training time, computational efficiency, a smaller training data set, a smaller labeled training data set, and the like. These benefits would not be available if the transformer model B were trained from scratch, without leveraging the neural network layers of the foundation model 210.

Figure 2C:
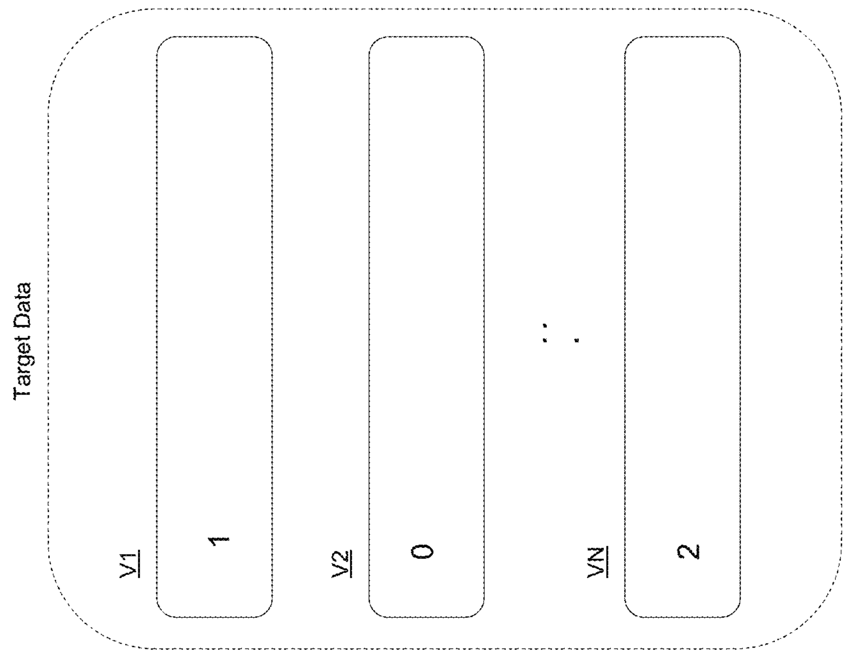
FIG. 2C is illustrative training data for training a transformer model for a multi-class classification task, according to an embodiment.
Figure 2C:
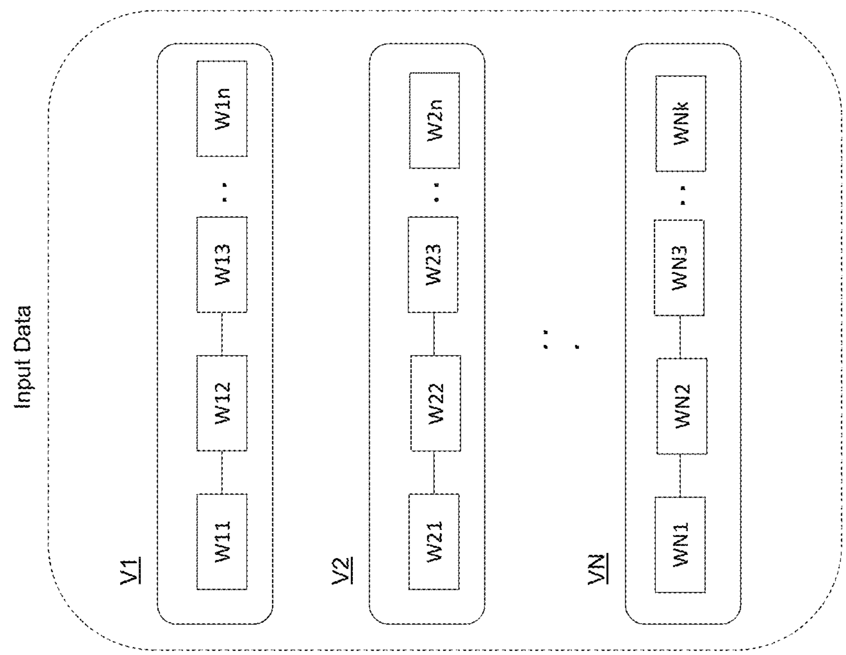

In various cases, the second training set (e.g., input data B) different from the first training set may be used. For example, the second training set may include input data that is sequences of website visits, and the target data, or labels for each record in the training data is the class membership of each record (as shown in FIG. 2B). The classifier can be a binary (two-class) classifier, for example, predicting whether or not the device will perform a conversion action for a particular brand. FIG. 2C shows that it could also be a multi-class classifier, as indicated by variables V1, V2, . . . VN that can include more than binary values. For example, such variables can be used for predicting which of a set of mutually exclusive demographic categories the device is associated with. In either case, the output can be used to inform the selection of media for targeted advertising.

Figure 2D:
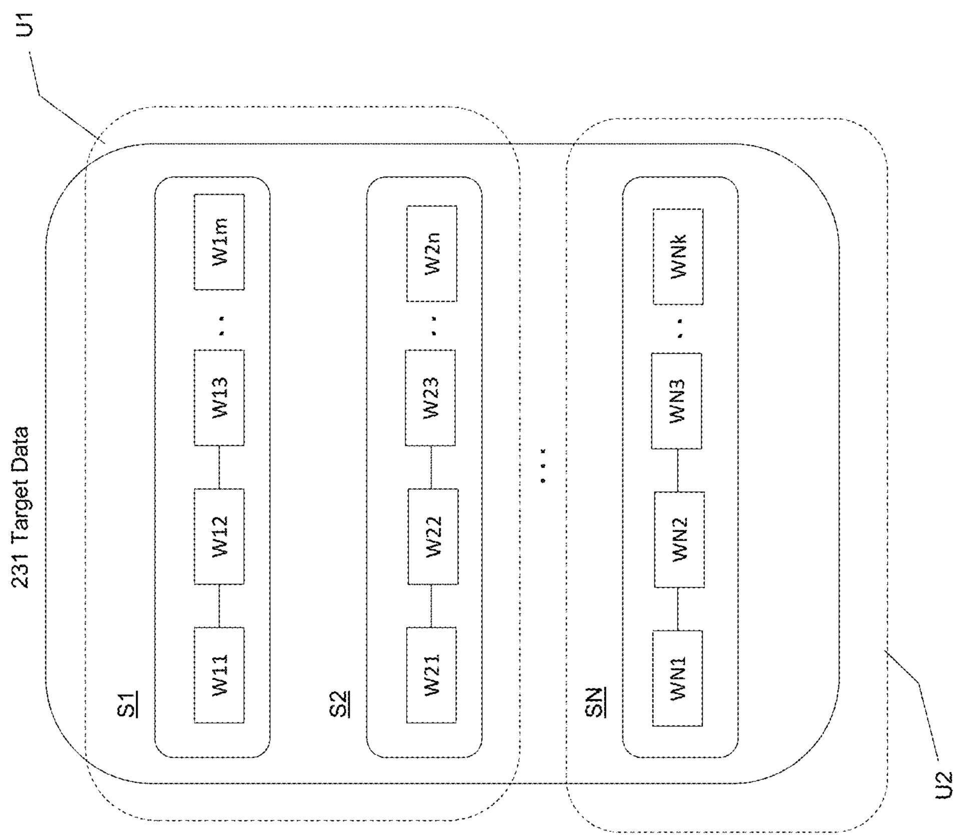
FIG. 2D is illustrative input data and target data for training a transformer model according to an embodiment.
Figure 2D:
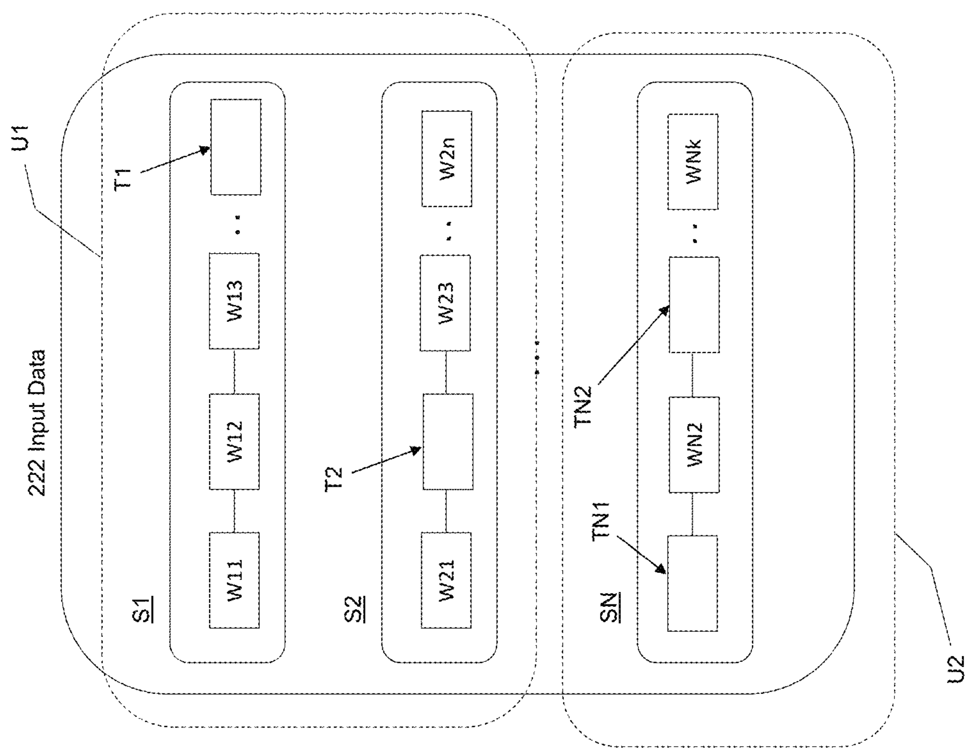

FIG. 2D shows example input data 222 having website visitation sequences S1-SN, with each sequence having one or more target websites to be predicted. For example, sequence S1 includes a sequence of websites W11-W13 and an unknown target website T1 that is to be determined by a transformer model. In some cases, the transformer model may determine a probability that a given website will be visited. Additionally, or alternatively, the transformer model may determine the most likely website that will be visited. As shown, target website T1 may be located at an end of the sequence S1 (e.g., the target website is to be predicted based on the ordered sequence W11-W13). Similarly, sequence S2 includes websites W21, W23-W2*n* with an unknown target website T2 that is located between websites W21 and W23 and is to be predicted based on the ordered sequence S2 of W21 and W23-W2*n*. Sequence SN includes a sequence of websites WN1-WNk with more than one target website, such as target websites TN1 and TN2 that are to be predicted by a transformer model that is being trained. FIG. 2D further shows target data 231 that is used to determine whether the transformer model correctly predicts the target websites, such as T1, T2, TN1, and TN2. The target data 231 is formed from the same sequences S1-SN with all the target websites substituted by example websites that are likely to be selected by a user (or that include historical user selection). For instance, for target website T1, a user is determined to select website W1*n*, for target website T2, a user is determined to select website W22, and for target websites TN1 and TN2 a user is determined to select websites WN1 and WN3. When training the model for this prediction task, the input data and the target data as shown in FIG. 2D together make up a labeled training set for a supervised learning model. Since this dataset can be constructed from any set of sequences of visits simply by masking select websites, this approach can be used to construct a self-supervised training task. In some cases, sequences S1-SN may be various visitation website histories for the same user, and in other cases, sequences S1-SN may be visitation website histories for more than one user. In some cases, some sequences (e.g., sequences S1-S2) can be visitation website histories for users of a user cluster U1, and other sequences (e.g., sequence SN) can be a visitation website histories of for users of another user cluster (e.g., a user cluster U2).

Figure 2E:
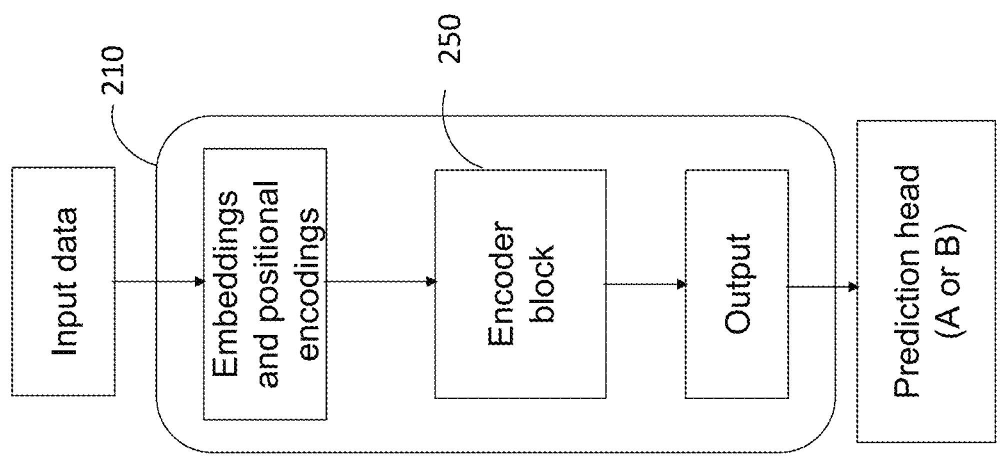
FIG. 2E is an illustrative example of the flow of data through a foundational model to a prediction head, according to an embodiment.

FIG. 2E shows the flow of data through a foundational model 210 to a prediction head. In the example of FIG. 2E, techniques such as embeddings and positional encodings represent text data numerically for a downstream model. Embeddings convert words or tokens into vectors capturing the semantic relationship. The conversion allows words with similar meanings to have similar representations. Positional encodings provide information about a position of each token within a sequence and enable the downstream model to understand the order and relative position of the tokens. Structurally, embeddings use a dense vector space where each word or token is mapped to a fixed-size continuous vector. This can be implemented by using an embedding matrix where rows correspond to unique tokens and columns represent dimensions of the vectors. In contrast, positional encodings are added or concatenated to the token embeddings. In some instances, the embeddings may be frozen (the parameters are not trainable) when the foundation model 210 is trained. Accordingly, a user has the option to use a variety of inputs for the embeddings. For example, the user could come up with a vector for each website using word embedding or large language model (LLM) embedding trained ahead of time and store those mappings for the foundational model 210.

In the instance of FIG. 2E, once input data is numerically represented, the data is input to at least one encoder block. Inputting the data into the encoder block helps the foundational model 210 to capture both the semantic meaning of the tokens and their positions within the sequence. Embeddings provide the model with dense representations of the tokens that reflect their meanings, and the positional encodings ensure the model can understand the order and relative position of the tokens. The combined input allows the encoder block to learn patterns and dependencies. Without positional encodings the model would lack information about token order.

Using multiple encoder blocks, such as the example encoder block 210 in FIG. 2E, in a model enhances the ability of the model to capture complex patterns and dependencies within the data. Each encoder block processes the input data through layers of self-attention and feed-forward networks, allowing learning of different aspects of the input sequence. In some examples, such as the example of FIG. 2E, a single encoder block is used. In other examples, multiple encoder blocks are stacked to progressively build more abstract and high-level representations of the data. The foundational model then generates an output, which is fed to the prediction head. In the example of FIG. 2E, the prediction head can be a missing word prediction head, or a classification prediction head. Other types of prediction heads may be used.

Figure 2F:
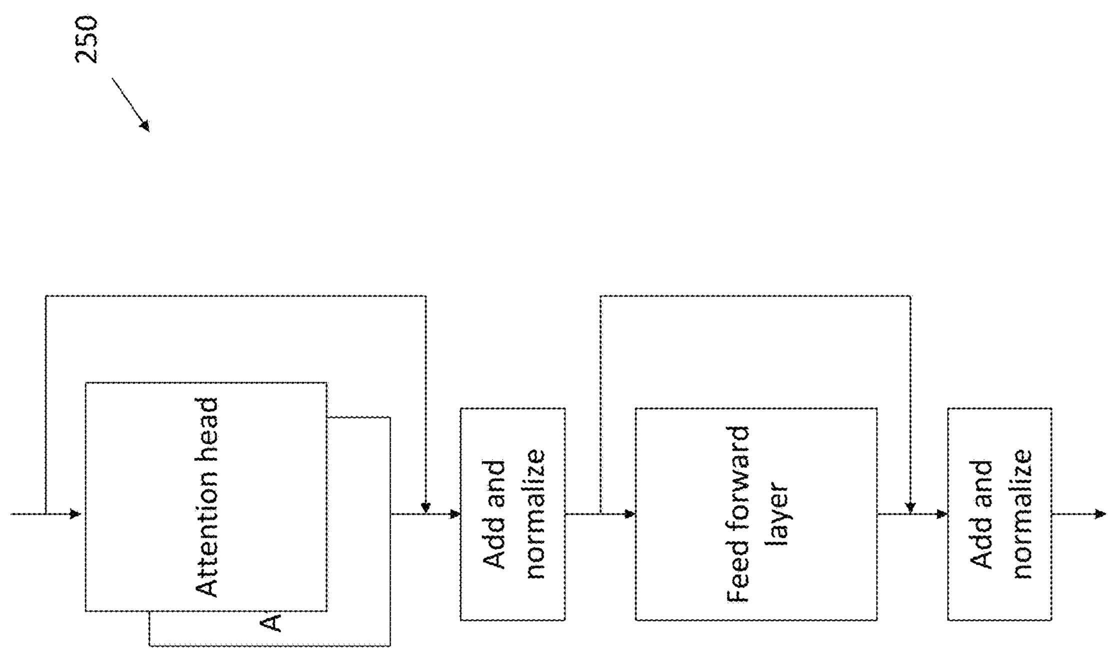
FIG. 2F is an illustrative example of the flow of data through the encoder block of the foundational model of FIG. 2E, according to an embodiment.

FIG. 2F shows the flow of data through the encoder block 250 of the foundational model 210 of FIG. 2E. embeddings and positionally encodings are fed into an attention head of an encoder block 250. An attention head is a component of an attention mechanism in transformer models that allows the model to focus on different parts of the input sequence when computing the representation of a token. Each attention head performs its own attention operation independently, which may involve a plurality of steps. In the example of FIG. 2F, two attention heads are used. In other examples, a different number of attention heads are used in parallel.

In the example of FIG. 2F, once the input embeddings and positional encodings are fed through the attention head, the output is added and normalized. This helps stabilize and accelerate the training process by ensuring that the outputs of the attention mechanism have a consistent scale and distribution. Additionally, adding the input of the attention layer to its output before normalizing helps preserve the original information from the input which can propagate crucial information across layers (depicted by the bypass arrow around the attention layer)

In the example of FIG. 2F, the added and normalized data is fed into a feed forward layer. The size of the feed forward layer (e.g., the number of neurons) can vary depending on the application. The feed forward layer further transforms and refines the representations. The feed forward layer operates independently on each token in the sequence and enhances the foundational model (e.g., Foundational model 210 of FIG. 2E) ability to capture intricate relationships within the data. The representations output from the feed forward layer are then added and normalized again. In some examples, additional layers may be used for further processing.

Figure 3A:
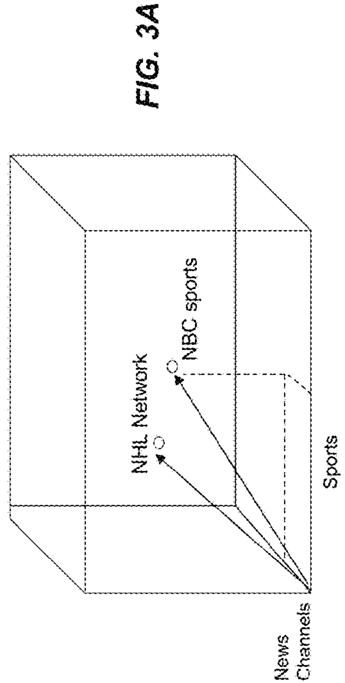
FIGS. 3A-3C are visualizations of a space of internet websites, according to an embodiment.

To further illustrate the use of embeddings, FIG. 3A shows an example N-dimensional vector corresponding to a TV channel "NBC Sports." Note that this vector is plotted in an N-dimensional space, having N axes, each referring to a different word or concept such as "Sports," "News Channels," and the like. In an example embodiment, vector corresponding to "NBC Sports" may have a sufficiently large non-zero component along directions "News Channels," "Sports," and "Basketball," while having only a small component, for example, along direction "Food." Similarly, a vector corresponding to "NHL Network" may also have non-zero substantial component along directions "News Channels," "Sports," "Winter," while having only a small component, for example, along direction "Basketball." Note, that all the words/concepts are represented as numerical embedding vectors. Further, while each axis is described as corresponding to a concept or word (news channels, sports, etc.) for ease of description, it should be understood that the precise concept or word associated with each axis is typically unknown or unknowable, except though inference of which words have large (or small) values along that axis. Similarly stated, the labels "News Channels" and "Sports" in FIG. 3A can represent post hoc approximations of the axes.

Figure 3B:
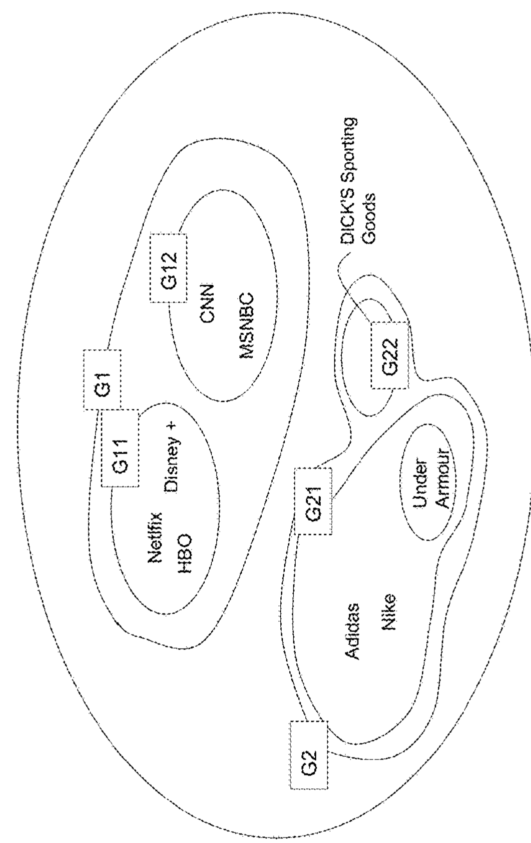

Having such embedding vectors allows for the establishment of relationships between words, and further allows for determining a likelihood of a word being presented in a sentence (for example, at a location within the sentence that includes a blank space). FIG. 3B shows that embeddings can be used to group various concepts into sets, subsets, and so on, for example, using clustering techniques as described in further detail herein. For example, Netflix, HBO, and Disney+ are determined to be part of subset G11, while CNN and NBC are determined to be part of subset G12. Both of subsets G11 and G12 may be determined to be part of subset G1 which may relate different TV channels. Similarly, Adidas, Nike, and Under Armor may be determined to be part of a subset G21, G22 may include "Dick's Sporting Goods" and G2 may be a set containing subsets G21 and G22. Such grouping into sets may also allow for determining similar concepts. Subsets are generally not predefined. Similarly stated, identifying subset G1 as relating to different TV channels may be the result of post hoc labeling, rather than the result of instructing a classifier to group or identify TV channels.

Embodiments described herein generally relate to a recognition that transformer models may be used not only for determining relations between words in sentences but may be used to determine relations between entities of any sequential data. In particular, as the words are encoded as p-dimensional numerical embedding vectors, transformer models can be trained to process with any sequential data, in which entities can be encoded (or represented) as p-dimensional numerical vectors.

In various embodiments disclosed herein, the sequence of websites, similar to the sequence of words, can be analyzed by the transformer models. The sequence of websites may be website visitation history of an example user or a training set made up of the website visitation history of a (large) number of users. Each website may be interpreted as a "word," and the ordered combination of visited websites may be interpreted as a "sentence" or a "paragraph."

Figure 3C:
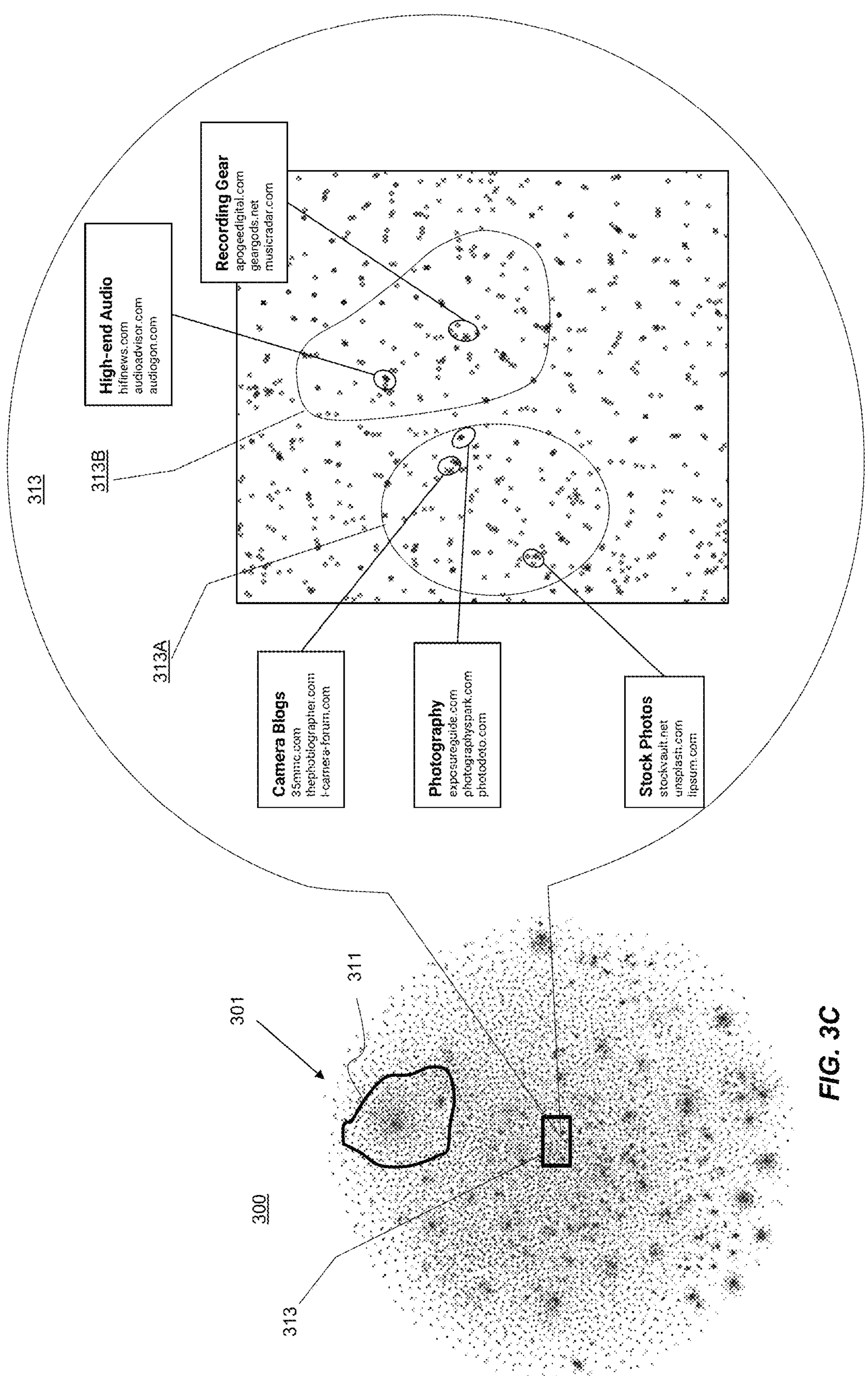

FIG. 3C shows points 301 representing various websites in the p-dimensional embedding space 300. In some cases, groups or clusters of websites can be identified, as shown in FIG. 3B. For example, website embedding vectors 311 located near each other in the p-dimensional space (according to any suitable distance metric) can be identified as belonging to a cluster, using k-means or another suitable clustering technique. FIG. 3C also shows a zoomed portion 313 of points representing the embedding vectors for various websites. The zoomed portion 313 may include mini-clusters associated with groups of websites. These mini-clusters may be arranged in various regions (e.g., regions 313A and 313B), with each region including websites (points shown in FIG. 3C) related to a particular topic. For example, region 313A includes websites related to graphics, while region 313B includes websites related to audio. In an example shown in FIG. 3B, region 313A includes a mini-cluster associated with Camera Blogs (e.g., websites 35mmc.com, thephoblographer.com, and 1-camera-forum.com), a mini-cluster associated with Photography (e.g., websites exposureguide.com. photographyspark.com, and photodoto.com), and a mini-cluster associated with Stock Photos (e.g., websites stockvault.net, unsplash.com, and lipsum.com). Further, region 313B includes a mini-cluster associates with High End Audio (e.g., websites hifinews.com, audioadvisor.com, and audiogon.com), and a mini-cluster associates with Recording Gear (e.g., websites apogeedigital.com, geargods.net, and musicradar.com).

In some cases, the distance between embedding vector for websites within p-dimensional space (e.g., how closely websites corresponding to these embedding vectors are associated with each other) is determined based on statistics of how close the websites corresponding to these embedding vectors are, on average, within a website visitation data sequence. For example, if newbalance.com is visited right after reebok.com is visited, such websites may be determined to be closely associated (e.g., the distance between embedding vectors for such websites in the p-dimensional space is small), whereas if after visiting reebok.com a user, on average, visits a large number of websites before visiting amazon.com, the amazon.com and reebok.com may be further apart (in terms of embedding vectors for these websites in the p-dimensional space) than reebok.com and newbalance.com. Further, in some cases, other factors (e.g., keywords, links, and the like) may be used for determining the proximity of embedding vectors for websites in the p-dimensional space.

When compared to representing websites as tokens, or as a large, sparse space of one-hot encoded vectors, defining an embedding can both reduce the dimensionality of the space and introduce a meaningful distance metric. In some instances, the embedding may be a relatively low-dimensional, learned continuous vector representation of the relatively high-dimensional representation. When representing websites as tokens or one-hot encoded representation, the size of the space is the same as the number of possible tokens. Generating an embedding allows for the reduction of dimensionality. By introducing a meaningful distance metric, defining a representation for websites in a continuous space allows a machine learning model to generalize from what is learned about one word to what is learned about other words, based on the relationship of those other words to the original word in the embedding space. This can allow the machine learning algorithm to make more use of limited data, since something a model learns about one website will generalize to varying extents to other websites, depending on the location of each in the embedding space.

A website embedding is a mapping of a website to a point in a p-dimensional vector space, where websites containing similar content are mapped to nearby points. The website visitation data can be received from a number of users whose internet activity has been monitored (e.g., by cookie-based tracking, browser plug-in, or any other suitable technique). In some instances, website visitation from over 10,000, over 100,000, over 500,000 or over 1,000,000 users would be received. Preferably the users whose internet activity has been monitored is a representative subset of the general internet browsing public. Weights and other suitable data processing techniques can be applied to behavioral data to compensate for demographic and/or behavioral deviations between the monitored users and the general internet browsing public. In some instances, the website visitation data for each user may include a list of all websites visited by that user and the order in which the websites were visited. In other instances, pairs of sequential website visitation events for a user can be stored for limited periods of time, optionally without any user identifiers, which can avoid the need to store full histories associated with specific users. The machine learning technique based on transformer models can be applied to the visitation data to define associations between websites based on which sites are frequently viewed in sequence.

In some cases, proximity between websites may be based on an order of websites being visited. Alternatively, the proximity of the websites is based on a time period between visitation events. For example, if multiple users are observed visiting www.netflix.com and www.hbo.com within a predetermined period of time and/or within a predetermined sequence (e.g., within 20 minutes, within an hour, without visiting any intervening websites, with fewer than five intervening websites, etc.), and similarly, multiple users (not necessarily the same users) are observed visiting www.tvtropes.com and www.hbo.com, then www.tvtropes.com and www.netflix.com can be mapped closer to each other in the p-dimensional embedding. Moreover, two websites (target websites) viewed in the same context (where context is the sequence of websites visited before or after the target website) can be moved closer to each other based on the frequency of websites viewed in the same context as observed over the set of all users.

A website embedding may be trained as part of training the transformer model itself, or it may be pre-trained using separate datasets, which may have the same format or a different format from the format dataset used to train the transformer model. For example, the website embedding may be trained using data containing sequences of website visits, using a model configured to predict the next website in a sequence or a missing website in a sequence. As another example, the website embedding may use a pre-trained word embedding or LLM embedding, and use words or concepts from each website to determine a position for the website in the word embedding. Website embeddings may be trained in a manner similar to those described in U.S. Pat. Nos. 10,902,009 and/or 11,068,935, the entire disclosure of each of which is hereby incorporated by reference in its entirety In addition to using an embedding to represent individual websites, the transformer model may use positional encoding to encode the position of each website in a sequence of websites. Website embeddings, along with positional encoding, allows for a rich representation of ordered sequences of web visits, which allows for machine learning processes that learn from and make predictions based on web visit histories.

Using transformer models, a concept of "attention" can be used to identify relationships between different positions in sequences. Self-attention in particular, that is, attention using only one sequence as input, can be used to identify relationships between difference positions in the same sequence, in our case, between different websites in a sequence of web visits. The attention identifies weights for connections between websites, such that websites with larger weights are more related to each other than websites with smaller weights. The attention weights are determined during a training of a transformer model. The transformer model neural network structure may have multiple attention heads in parallel (so-called multi-head attention), which allows it to learn multiple relationships between positions in a sequence. Within the transformer model neural network structure, the attention mechanism may be part of an encoding stack, which contains multiple additional layers such as a feed forward layer a normalization layer, and connections. Multiple of these encoding stacks may combined in sequence in order to learn a richer set of relationships, or only one encoding stack can be used. The website embeddings, along with the positional encoding, and one or more encoding stacks, and other layers, can all be part of the foundation model shown in figure A.

Figure 4:
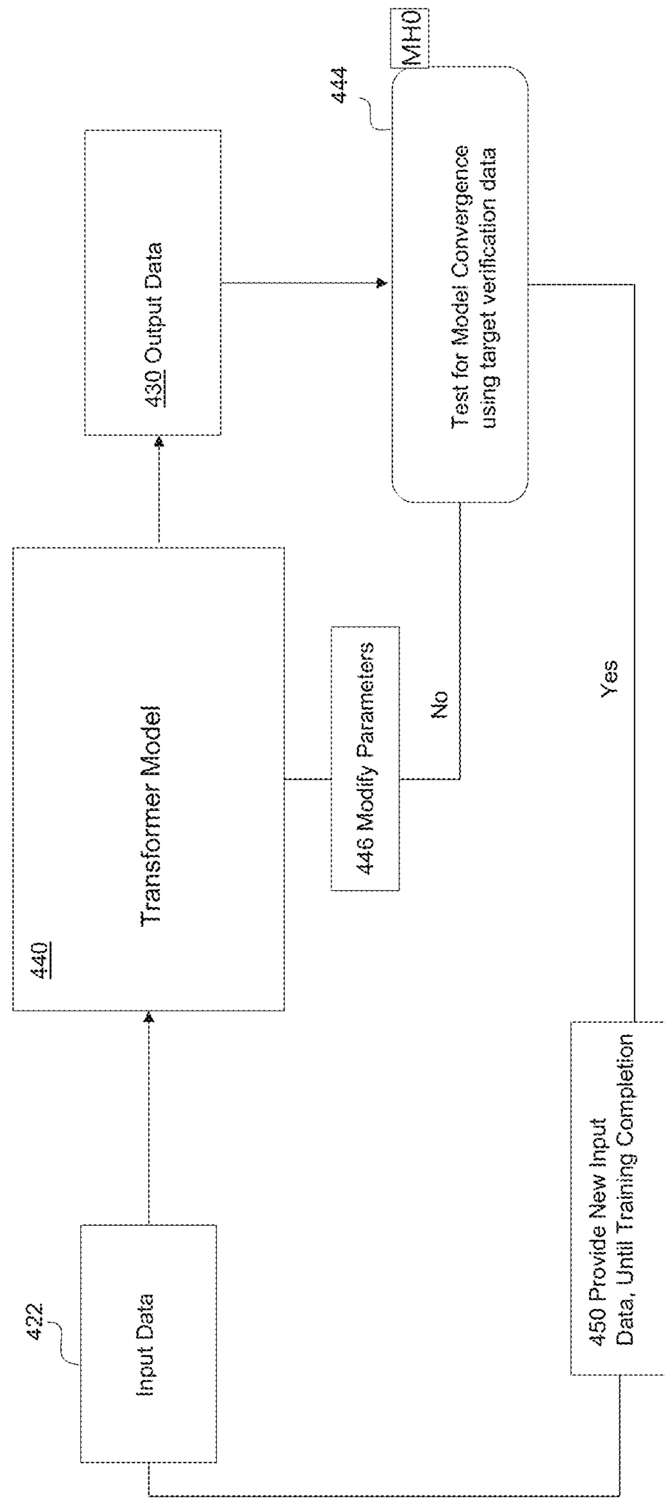
FIG. 4 is an illustrative diagram for training a transformer model according to an embodiment.

FIG. 4 shows an example schematic diagram for training a transformer model 440 using input data 422, which is structured similarly to the input data 222 (or the input data in figure B and figure C). In some cases, input data 422 may have a first set of sequences S1-SN, and another input data may have a second set of sequences and may be supplied after the transformer model is has been trained using the first set of sequences S1-SN. The input data 422 is provided to the transformer model 440, and the transformer model is configured to determine output data 430, reflecting a prediction of the target data as shown in FIG. 2B or 2C. Note the transformer model may be configured to output a "hard" prediction, that is output the one most likely target output, or it may output a probability of predictions, such as a probability vector across all possible outputs (e.g., websites or class membership). The training of transformer model 440 further includes a step of determining how closely predictions of the model (the output data) match the target data. The success of the prediction can be measured using an appropriate loss function. The choice of loss function depends on the specific prediction task and can also depend on any business goals associated with that prediction task. In the case of a masked language model, the prediction of a masked website within a sequence of sites can be framed as a categorical or multi-class classification problem, and sparse categorical cross entropy can be used as a loss function. In the case of a binary classifier prediction conversion probability for one conversion action, binary cross entropy can be used as a loss function. It should be noted that these loss functions are only illustrative, and any other suitable loss function can be used. Such measure of the loss function herein is simply referred to as a loss function between the output data 430 and target data. If the model has converged, or if predetermined early stopping criteria have been met, the training is determined to be complete. Criteria for model convergence may be determined based on the change in the training loss (the loss function calculated on the training data) between training iterations, or on the validation loss (the loss calculated on a separate validation dataset of the same form, where results from the validation dataset are not used to update the model weights) or change in validation loss, or some combination.

If in a test for model convergence process 444 it has been determined that the model has not converged as indicated schematically by a process (444, No) in FIG. 4, various parameters of the transformer model 440 may be adjusted. As transformer model 440 is a neural network (e.g., a neural network typical for transformer models that incorporates encoder and decoder blocks, which include, among other things, neural network blocks for embedding data records (e.g., websites), assigning attention (weights) for determining websites' relationships), and modifying embedded data records based on the determined attention weights. In various embodiments, the encoder and decoder blocks include parameters which when adjusted using back propagation results in a higher degree of similarity between the output data 430 and target data, as measured by the loss function.

Figure 5:
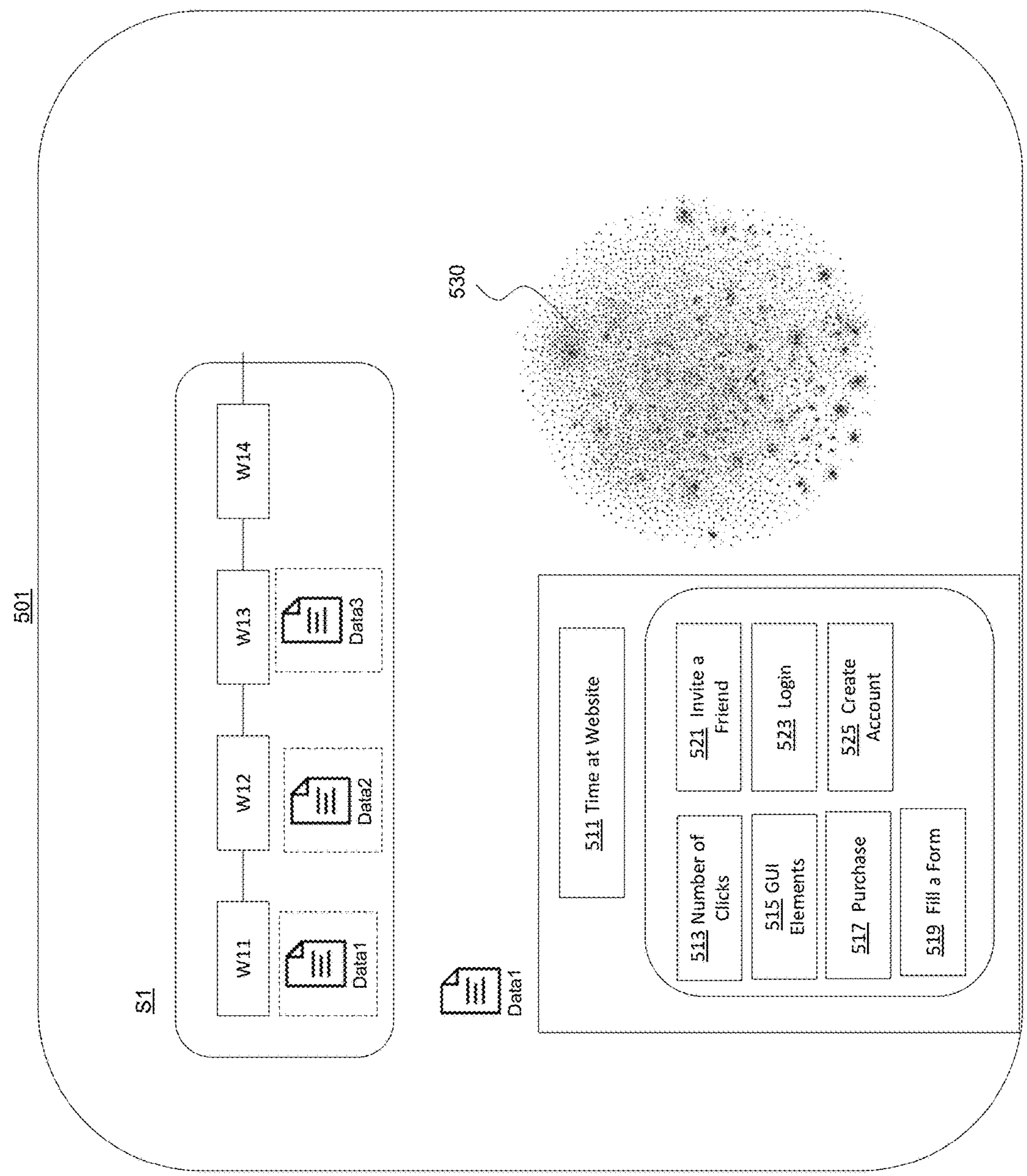
FIG. 5 is illustrative input data for training a transformer model according to an embodiment.

It should be noted that training data that includes visitation website history, such as input data 222, as shown in FIG. 2D, is only one possible example of the input data, and, in some cases, more complicated input data may be used for training a transformer model. For instance, FIG. 5 shows an example input data 501 that includes a sequence S1 of websites W11-W14, with at least some websites (e.g., websites W11-W13) having associated data records Data1-Data3. Data records may indicate conversion event data about a particular conversion action of a user at a website. For example, Data1 may be associated with a website W11 and may include conversion event data such as a time 511 that a user spends at the website W11. Further, the conversion event data of Data1 may include a number of clicks 513 that the user makes at that website, what type of GUI elements 515 that the user has interacted at the website W11 (e.g., the user may interact with a mouse or a keyboard with various GUI elements 515, and such interaction may be recorded as part of the conversion event data of Data1). Further the conversion event data of Data1 may include purchases 517 performed by the user at the website W11, form filling actions 519, friend invitations 521 (or friend referral), activities associated with user login 523 (e.g., signing into an account or changing account settings), or account creation 525. It should be noted that above examples of Data1 are only illustrative and any other data (e.g., conversion event data) may be collected associated with the user interacting with the website W11. For example, data associated with a time between different mouse clicks may be collected, data associated with user watching a video, and/or skipping advertisement may be collected as the conversion event data. For example, data associated with a time that user spends before skipping an advertisement displayed at the website W11 may be collected (when such an advertisement is available at the website). Further, the data related to user sharing content at the website with other users may be collected and used as a part of the conversion event data of Data1.

In some cases, when multiple users interact with the same website e.g., when multiple users participate in a meeting at a particular website, when multiple users shop together or share content at a website, when multiple users exchange messages at or about the website (e.g., leave comments, or chat with a service provider at the website) conversion actions of these multiple users may be collected and correlations between these actions of the multiple users may be analyzed and used as a part of the conversion event data of Data1.

FIG. 5, shows that in addition to Data1-Data3, and sequence of websites W11-W14, input data 501 may further include a representation of websites 501 determining an featurization, encoding, embedding in a space, or other way to represent the websites that may have been obtained using approaches other than transformer models. In the example embodiment, the representation of websites 530 may be similar to or the same as the space of continuous embedding vectors 301, each vector encoding for a website 301, as shown in FIG. 3C. For example, the representation of websites 530 and their relationships may be determined based on description of the websites (e.g., by clustering websites based on keywords found within website pages, or finding principal components or topics in a topic model representation of the content found within website pages), based on visitation order (e.g., when two websites are visited one after another these websites may be determined to be closely positioned or related) or based on types of users visiting the websites. Further, the websites may be clustered (e.g., based on keywords) via any known clustering techniques such as decision tree clustering, k-means clustering, mean-shift clustering, and the like. Thus, input data 501 may be a complex data that includes conversion event data associated with user behavior when visiting various websites.

Figure 6:
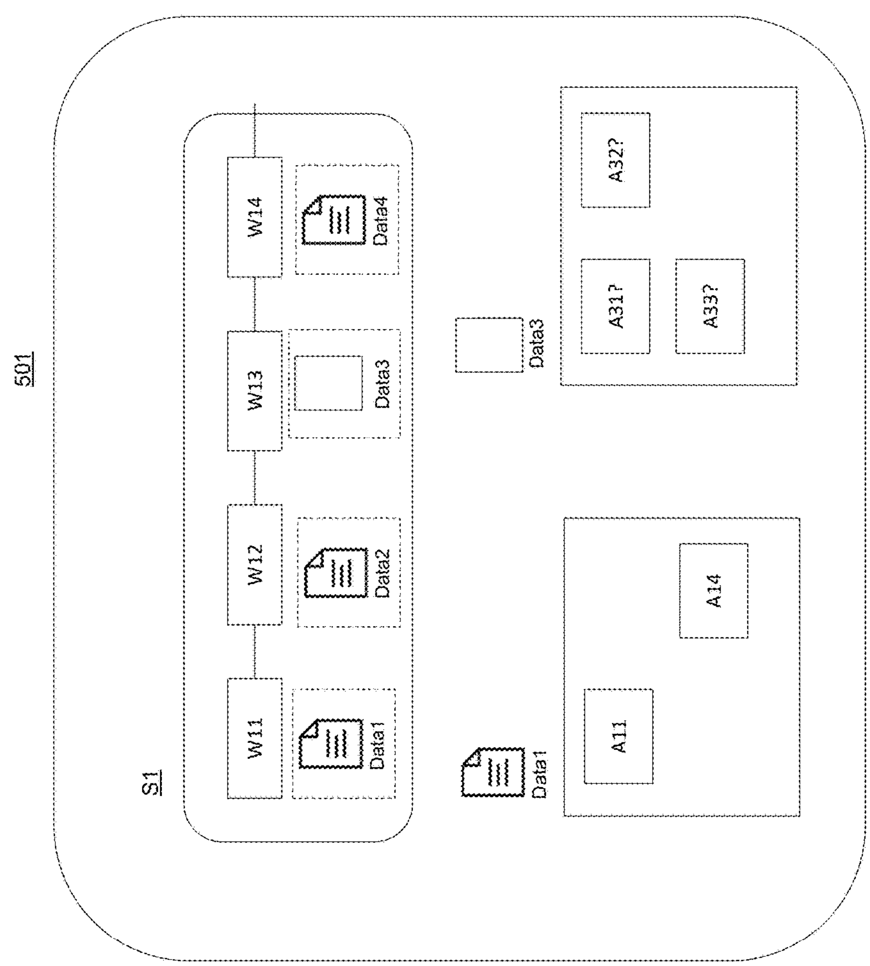
FIG. 6 is another illustrative input data for training a transformer model including information about actions performed by a user according to an embodiment.

In some cases, instead of (or besides) predicting which website a user is going to visit, the transformer model may be configured to predict a type of action a user is configured to perform at a particular website, based on various actions identified in Data1-Data3 and their correlation with websites W11-W14. For example, FIG. 6 shows possible websites W11-W14 that a user visited, with associated respective data Data1-Data4 describing user actions at these websites. Data1, Data2, and Data4 may have known actions that were performed at respective websites W11, W12, and W14. For example, Data1 indicates that actions A11 and A14 were performed at the website W11. Data3 may not show known actions performed by the user at the website W13, and the transformer model may be configured to predict which one of actions A31, A32, or A33 are likely to be performed by the user when the user visits website W13. Such prediction may be based on training data containing visitation website history and various actions performed at each of the websites.

Figure 7:
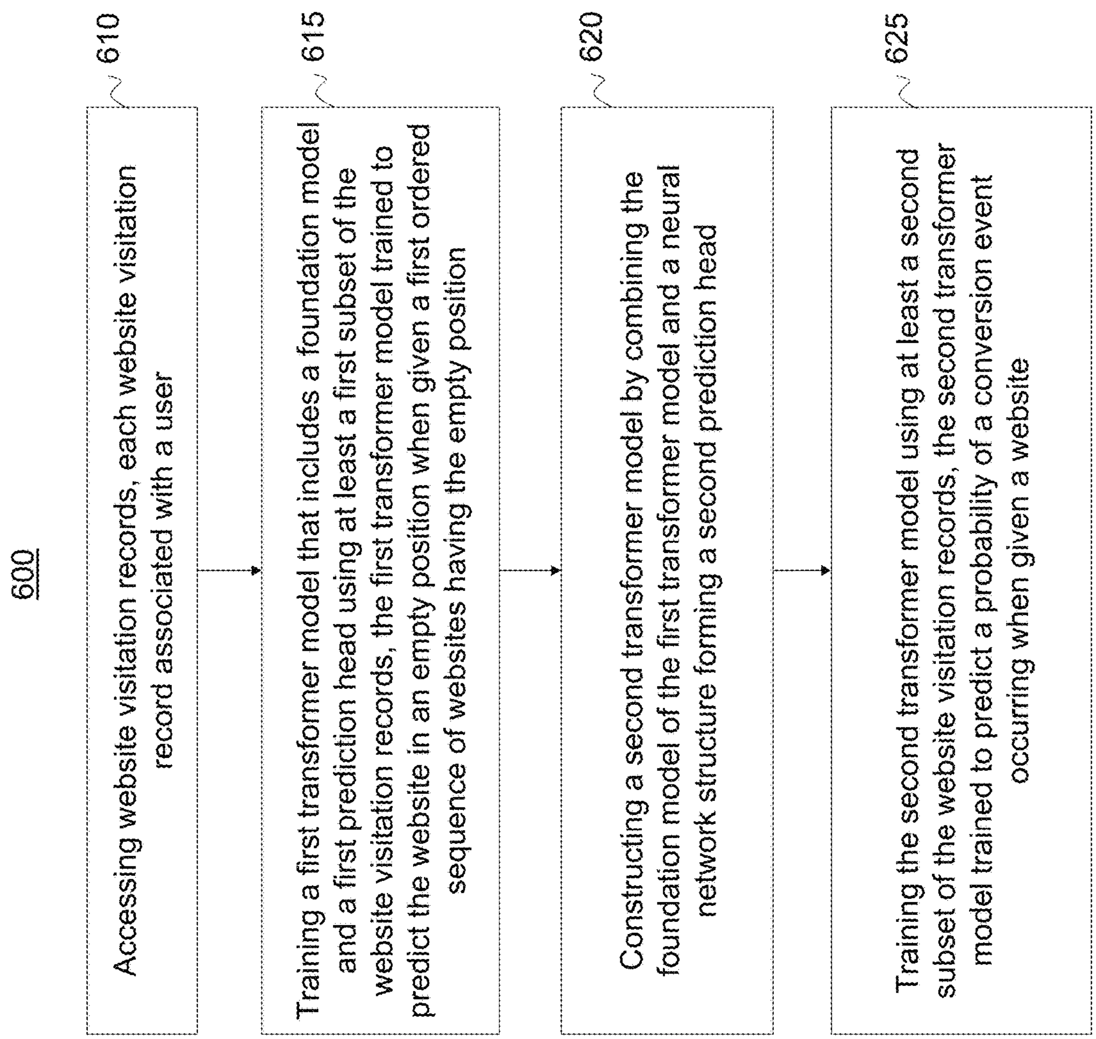
FIG. 7 is an example of a method of training a transformer model according to an embodiment.

Consistent with disclosed embodiments, a method 600 of training a transformer model is shown in FIG. 7. The method 600 includes accessing website visitation records, each website visitation record associated with a user at 610. As previously described, the website visitation records include any suitable data records associated with users browsing the internet. In various cases the website visitation records include ordered website data records. For example, website data records may be organized as a sequence of the website addresses. Additionally, or alternatively, a timestamp, may be assigned to the record indicating when website was accessed by a user. In some cases, a timestamp may include a starting time indicating when a user arrived at a website and a finishing time indicating when the user left the website. Further, the ordered website data records may be organized in a linked list of website records (e.g., singly linked data structure, double linked data structure, and the like). The links provide indication of the order that the websites associated with website records were visited. It should be noted that website records can include various data associated with user interacting with a website. For example, the website record can include a website address, a name of a website, graphical user interface accessed by the user at the website, an indication of multimedia data (e.g., video clips, sound clips, and the like) accessed by the user at the website, information associated with forms filled by the user at the website, or indication of any other activity of the user at the website. Further, in some cases, as described above, in addition to accessing the website visitation records, the method 600 may include accessing store visitation history data, device usage data or application usage data.

The method 600 includes training a first transformer model using at least a first subset of the website visitation records at 615. In various cases, the first transformer model includes a foundational model and a first prediction head, as described above. The first transformer model may be trained to predict the website in an empty position when given a first ordered sequence of websites having the empty position. As used herein, the phrase "ordered sequence of websites" generally refers to a dataset including indications of websites visited by user(s) (e.g., URLs) in an ordered format, or with additional data, such as time stamps, such that the order in which the user(s) visited the websites can be ascertained.

Further, the method 600 includes constructing a second transformer model by combining the foundation model of the first transformer model and a neural network structure forming a second prediction head at 620. The second transformer model is configured to predict a probability of a conversion event occurring when given a website.

The method 600 further includes training the second transformer model using at least a second ordered sequence of website visitation records to predict the probability of the conversion event occurring when user visits a given website at 625. In some cases, the second transformer model, instead of (or in addition to) predicting the probability of the conversion event occurring, may be configured to perform any other suitable task, such as to predict which impression shown to the user may cause the highest conversion likelihood, to provide additional information (e.g., website links) for causing a user to access websites that result in high conversion likelihood, and the like.

In various cases, after the second transformer model is trained, the second transformer model may be used to receive an ordered sequence of website visitation records and predict a probability of the conversion event occurring for a user associated with those website visitation records.

The prediction of the probability of the conversion event occurring can be used to select targeted content for display to the user. In some instances, the prediction of the probability of the conversion event occurring can be based on an item of targeted content being displayed to the user.

In various implementations, a foundation model of the transformer model may be configured to encode each website represented in the first subset of the plurality of website visitation records into a p-dimensional numerical vector, which can be represented in a p-dimensional embedding. In some cases, instead of predicting the probability of the conversion event, the transformer model may be trained to predict the website in an empty position of an ordered sequence of websites based on the position of the website in the p-dimensional embedding.

In various cases, a transformer model may be implemented as a set of instructions stored in a non-transitory processor-readable medium. In some implementations, the instructions are configured to cause a processor to receive an ordered sequence of websites visited by a user and apply a trained transformer model to the ordered sequence of websites to predict a subsequent website in the ordered sequence of websites and/or to predict a probability of a conversion event occurring for target content. When trained to predict the probability of the conversion event, the transformer model may be configured to present a target content with a largest probability of a conversion event to the user. In some cases, the instructions may cause the processor to perform operations that may further include receiving data including at least one of store visitation history data, device usage data, or application usage history and using the received data by the trained transformer model to predict the probability of a conversion event occurring for target content. Additionally, or alternatively, the operations may further include accessing conversion event data associated with the user and using the conversion event data by the trained transformer model to predict the probability of a conversion event occurring for target content. The conversion event data may include purchase information from purchase confirmation websites, or a purchase history associated with a user account. Additionally, or alternatively, the operations may further include accessing a physical location of a device of the user and using the physical location by the trained transformer model to predict the probability of the conversion event occurring for target content.

In some implementations, the instructions may cause the processor to perform operations that can include receiving website visitation records associated with multiple users. The website visitation records for each user can indicate an ordered sequence of websites visited by that user. Additionally, the operations can include training a transformer model using the website visitation records. Once trained, the transformer model can be configured to receive an ordered sequence of websites visited by a user, which was not previously included in the website visitation records and identify a cluster of websites in an embedding space associated with a subsequent website in that ordered sequence. Furthermore, the transformer model may select an item of targeted content to present based on the cluster of websites.

The transformer model can be utilized by different systems integrated into a network, such as the network 190. For instance, the audience authentication device 110, the targeted content provider 120, or any other suitable computing system may utilize a foundation model as a part of one or more transformer models to deliver targeted content to users. In an illustrative implementation, a system may comprise at least one memory device storing instructions and at least one processor configured to execute those instructions to carry out various operations. These operations may involve training a transformer model using a plurality of website visitation records to predict the next website to be visited by a user, as well as the likelihoods of one or more conversion actions by the user at the predicted website. Furthermore, based on the predicted website and the likelihoods of the conversion actions, the operations can involve determining the target content to be provided to the user at the predicted website.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Aspects of the present disclosure are related to system and methods for determining a probability of a conversion event of an impression at a given website. It should be noted that ads may be displayed not only on websites per se, but on any other suitable advertisement inventory or ad placements within a digital advertising platform including mobile in-app advertising, connected TV, digital out-of-home, or any other platform or medium. The term "website" used throughout this disclosure for ease of discussion, should be understood as including any suitable electronic platform or medium through which dynamic content (including advertisements) can be viewed, accessed, or consumed. Thus, where embodiments describe the prediction of the probability of the conversion event occurring given for a particular website or given a particular sequence of website visitation records, it should be understood that such embodiments can also be used to predict conversion events and/or select targeted content for, for example, a television, television program, mobile device, mobile application or app, in-app content, or digital out-of-home devices, such as billboards, or gas station pump screen.

Aspects of the present disclosure relate collecting website visitation history, which may be used to train transformer models and/or used to make predictions about subsequent website visitations, conversion events occurring, and/or selection of targeted content. It should be understood that such disclosure applies to any suitable behavioral and/or content consumption information. For example, it should be understood that where website visitation data is discussed, media consumption (e.g., television shows, movies, music, etc.), application usage, content viewed in apps, physical location, a time of day at which a user accesses content, a location of a user accessing the inventory, graphical dimensions of a space associated with the content, or any other suitable information.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

As used herein in the specification and in the claims, the terms "target" and "control target" are used interchangeably.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory, processor-readable medium storing code configured to be executed by a processor, the code comprising instructions to cause the processor to:

train a first transformer model with a plurality of website visitation records to predict a missing website in a sequence of websites based on a sequence of locations in a p-dimensional embedding, each location from the sequence of locations associated with a website represented in the plurality of website visitation records, the first transformer including a foundation model and a first prediction head; and train a second transformer model with a plurality of conversion event data to predict a probability of a conversion event occurring, the second transformer model including the foundation model and a second prediction head.

2. The non-transitory, processor-readable medium of claim 1, wherein an architecture of the first transformer model was developed for natural language processing tasks.

3. The non-transitory, processor-readable medium of claim 1, wherein the plurality of website visitation records includes at least one of store visitation history data, device usage data, or application usage history.

4. The non-transitory, processor-readable medium of claim 1, wherein each website represented in the plurality of website visitation records is represented by a vector associated with a location in a p-dimensional embedding space.

5. The non-transitory, processor-readable medium of claim 1, wherein each website visitation record of the plurality of website visitation records includes a timestamp indicating a time a website associated with that website visitation record was visited.

6. The non-transitory, processor-readable medium of claim 1, the code further comprising code to cause the processor to encode each website from the sequence of websites into a vector associated with a location in the p-dimensional embedding.

7. The non-transitory, processor-readable medium of claim 6, wherein:

the first transformer model is configured to receive the sequence of websites;

the sequence of websites has an empty position; and the first transformer model is configured to output a prediction of a website in the empty position based on the location of each website from the sequence of websites in the p-dimensional embedding.

8. The non-transitory, processor-readable medium of claim 1, the code further comprising code to cause the processor to:

receive an indication of a sequence of website visitations; and predict the probability of the conversion event occurring based on the sequence of website visitations using the second transformer model.

9. The non-transitory, processor-readable medium of claim 1, the code further comprising code to cause the processor to:

receive an indication of a sequence of website visitations;

encode each website included in the sequence of websites into a vector from a plurality of vectors, each vector from the plurality of vectors associated with a location in the p-dimensional embedding; and predict a probability of the conversion event occurring based on the sequence of the plurality of vectors.

10. A computer-implemented method, comprising:

accessing a first dataset representing a first set of website visitation records;

accessing a second dataset representing a second set of website visitation records;

training a first transformer model using the first dataset to predict a website in an empty position of a sequence of websites, each website from the sequence of websites defining a point in a p-dimensional embedding, the first transformer model including a foundation model and a first prediction head;

training a second transformer model using the second dataset, the second transformer model including the foundation model and a second prediction head;

receiving a third dataset representing a sequence of websites; and predicting a probability of a conversion event based on the third data set and using the second transformer model.

11. The method of claim 10, wherein each website represented in the first data set, the second data set, and the third data set is represented by a vector associated with a location in the p-dimensional embedding space.

12. The method of claim 10, wherein each data point of the first dataset includes a timestamp indicating a time associated with generating that data point.

13. The method of claim 10, wherein the second dataset includes data records indicating conversion event data.

14. The method of claim 10, further comprising:

receiving an ordered sequence of website visitation records; and applying the second transformer model to the ordered sequence of website visitation records to predict a probability of the conversion event occurring based on the ordered sequence of website visitation records.

15. The method, of claim 10, further comprising:

masking a website in the first dataset, to train the first transformer model, training the first transformer model includes comparing the website the first transformer model predicts in the empty position to a target website, the target website being the masked website.

16. The method of claim 15, wherein training the first transformer model includes:

evaluating a difference between the website the first transformer model predicts in the empty position and the target website using a loss function; and adjusting a parameter of the first transformer model when the loss function does not meet a predefined threshold.

17. The method of claim 15, wherein training the first transformer model includes:

evaluating a difference between a website the first transformer model predicts in the empty position and the target website using a loss function; and adjusting a first parameter of the first transformer model when the loss function does not meet a predefined threshold while holding a second parameter of the first transformer model constant.

18. The method of claim 15, wherein the first parameter is associated with at least one of an encoder block or another block of the first transformer model and the first parameter is adjusted using backpropagation.

* * * * *